(12) United States Patent
Yamamoto (10) Patent No.: US 6,877,391 B2
(45) Date of Patent: *Apr. 12, 2005

(54) GEAR CHANGE DEVICE (75) Inventor: Yasushi Yamamoto, Kanagawa (JP)

(73) Assignee: Isuzu Motor Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/813,074

(22) Filed: Mar. 31, 2004

(65) Prior Publication Data

US 2004/0177712 A1 Sep. 16, 2004

Related U.S. Application Data (62) Division of application No. 10/050,864, filed on Jan. 18, 2002.

(30) Foreign Application Priority Data

Jan. 22, 2001 (JP) ........................................ 2001-13162
Sep. 28, 2001 (JP) ...................................... 2001-300833

(51) Int. Cl.$^7$ .............................................. F16H 59/02
(52) U.S. Cl. ..................................... 74/473.12; 74/335
(58) Field of Search ............................. 74/473.12, 225

(56) References Cited

U.S. PATENT DOCUMENTS

| 4,567,969 | A | 2/1986 | Makita |
| 4,860,792 | A | 8/1989 | Ichihashi et al. |
| 5,191,804 | A | 3/1993 | Genise |
| 5,241,292 | A | 8/1993 | Bjorknas et al. |
| 5,471,893 | A | 12/1995 | Newbigging |
| 5,689,997 | A | 11/1997 | Schaller |
| 5,743,143 | A | 4/1998 | Carpenter et al. |
| 6,382,042 | B1 | 5/2002 | Bovina et al. |
| 6,634,249 | B2 * | 10/2003 | Yamamoto ............... 74/473.12 |
| 2003/0074998 | A1 | 4/2003 | Esly et al. |

FOREIGN PATENT DOCUMENTS

| DE | 198 42 532 A1 | 9/1999 |
| GB | 2 360 556 A | 9/2001 |

OTHER PUBLICATIONS

Lequesne, "Fast–Acting Long–Stroke Bistable Solenoids with Moving Permanent Magnets", May/Jun. 1990, IEEE Transactions on Industry Applications, vol. 26, No. 3.

European Search Report dated Nov. 25, 2003.

* cited by examiner

Primary Examiner—Robert A. Siconolfi
Assistant Examiner—Bradley T King
(74) Attorney, Agent, or Firm—James N. Dresser, Esq.

(57) ABSTRACT

A gear change device includes a select actuator for operating a shift lever in a direction of selection and a shift actuator for operating the shift lever in a direction of shift. The select actuator includes a casing, a shift lever support member that is disposed in the casing so as to slide in an axial direction. The shift lever support member supports the shift lever, a magnetic moving member disposed on the outer periphery of the shift lever support member, a cylindrical fixed yoke surrounding the magnetic moving member, and a coil disposed on the inside of the fixed yoke.

2 Claims, 10 Drawing Sheets

GEAR CHANGE DEVICE

The present Application is a Divisional Application of U.S. patent application Ser. No. 10/050,864, filed on Jan. 18, 2002.

FIELD OF THE INVENTION

The present invention relates to a gear change device for shifting a transmission mounted on a vehicle.

DESCRIPTION OF THE RELATED ART

A gear change device for shifting a transmission comprises a select actuator for operating a shift lever in the direction of selection and a shift actuator for operating the shift lever in the direction of shift.

As the select actuator and the shift actuator, there have generally been used fluid pressure cylinders which provide fluid under pressure, such as air under pressure or hydraulic fluid under pressure, as a source of actuation. The select actuator and the shift actuator using the fluid pressure cylinders require piping connecting the source of fluid pressure to the actuators, an electromagnetic change-over valve for changing over the flow passage of the operation fluid, and space for the arrangement thereof, resulting in an increase in the weight of the device as a whole.

In recent years, there have been proposed a select actuator and a shift actuator constituted by electric motors as a device for shifting a transmission mounted on a vehicle which is provided with neither a source of compressed air nor a source of hydraulic fluid under pressure. The select actuator and the shift actuator constituted by electric motors need neither the piping for connection to the source of fluid pressure nor the electromagnetic change-over valve, unlike the actuators that use fluid pressure cylinders, and can, hence, be constituted in a compact size as a whole and in a reduced weight.

The actuator using an electric motor needs a speed reduction mechanism for obtaining a predetermined operating force. As the speed reduction mechanism, there have been proposed a ball-screw mechanism and a gear mechanism. However, the actuators using a ball-screw mechanism or a gear mechanism are not necessarily satisfactory in regard to the durability of the ball-screw mechanism and the gear mechanism and in regard to the durability and the operation speed of the electric motor.

SUMMARY OF THE INVENTION

It is an object of the present invention to provide a gear change device equipped with a select actuator which features excellent durability and a high operation speed.

According to the present invention, in order to achieve the above-mentioned object, there is provided a gear change device having a select actuator for operating a shift lever in a direction of selection and a shift actuator for operating the shift lever in a direction of shift, wherein the select actuator comprises a casing, a shift lever support member that is disposed in the casing so as to slide in an axial direction and that supports the shift lever, a magnetic moving means disposed on the outer periphery of the shift lever support member, a cylindrical fixed yoke surrounding the magnetic moving means, and a coil disposed on the inside of the fixed yoke.

The shift lever support member comprises a cylindrical shift sleeve which is disposed slidably in the axial direction on a control shaft that is rotatably disposed in the casing and is caused to turn in the direction of shift by the shift actuator. Further, the shift lever support member comprises a control shaft which is disposed rotatably and slidably in the axial direction in the casing and is caused to turn in the direction of shift by the shift actuator.

The coil is constituted by a pair of coils disposed adjacent each other in the axial direction. The magnetic moving means is constituted by an annular permanent magnet mounted on the outer peripheral surface of the shift lever support member and having magnetic poles in both end surfaces thereof in the axial direction, and moving yokes arranged respectively on the outer sides of the permanent magnet in the axial direction thereof.

The magnetic moving means comprises a moving yoke mounted on the outer peripheral surface of the shift lever support member and an annular permanent magnet mounted on the outer peripheral surface of the moving yoke and having magnetic poles in the outer peripheral) surface and in the inner peripheral surface thereof, the moving yoke having a cylindrical portion on which the permanent magnet is mounted, with annular flanges provided at both ends of the cylindrical portion, and with the outer peripheral surfaces of the flanges located close to the inner peripheral surface of the fixed yoke.

Further, the magnetic moving means comprises an intermediate yoke mounted on the outer peripheral surface of the shift lever support member, a pair of annular permanent magnets disposed respectively on both sides of the intermediate yoke to hold it therebetween and having magnetic poles in both end surfaces thereof in the axial direction, and moving yokes disposed respectively on the outer sides of the pair of permanent magnets in the axial direction thereof, the moving yokes having annular flanges located close to the inner peripheral surface of the fixed yoke. It is desired that the pair of permanent magnets have the same polarity in the end surfaces opposed to each other.

It is further desired that the select actuator have a select position-limiting means for limiting the operation position of the shift sleeve according to a thrust produced on the shift sleeve in proportion to the amount of electric power supplied to the coil.

BRIEF DESCRIPTION OF THE DRAWINGS

Each of FIGS. 4A and 4B is a view illustrating the operation of a select actuator in the gear change device shown in FIG. 1 according to a first embodiment.

Each of FIGS. 6A and 6B is a view illustrating the operation of the select actuator that constitutes the gear change device shown in FIG. 5 according to the second embodiment.

Each of FIGS. 8A and 8B is a view illustrating the operation of the select actuator that constitutes the gear change device shown in FIG. 7 according to the third embodiment.

DETAILED DESCRIPTION OF THE PREFERRED EMBODIMENTS

Preferred embodiments of the gear change device constituted according to the present invention will now be described in further detail with reference to the accompanying drawings.

Figure 1:
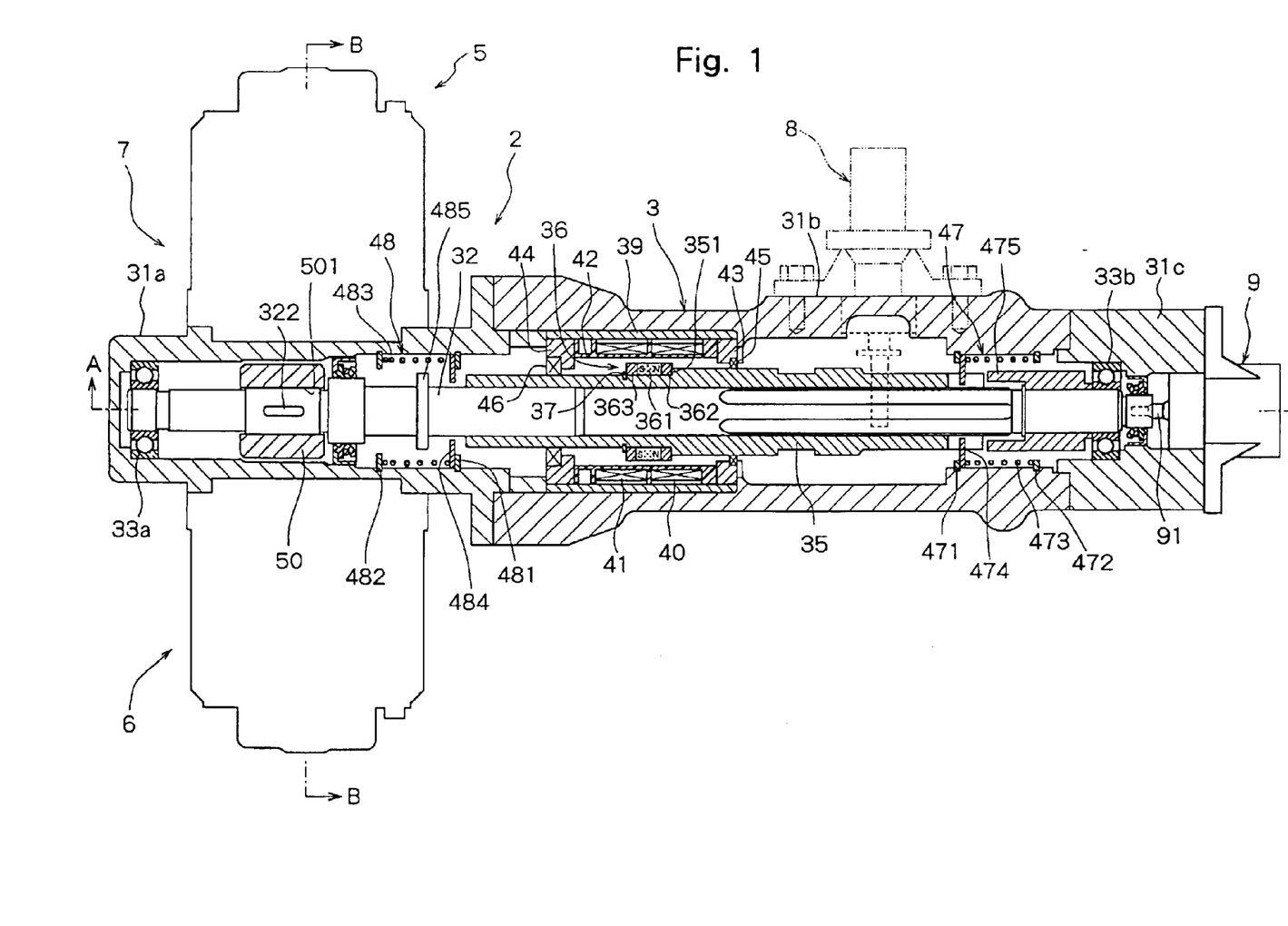
FIG. 1 is a sectional view illustrating a gear change device constituted according to an embodiment of the present invention.
Figure 2:
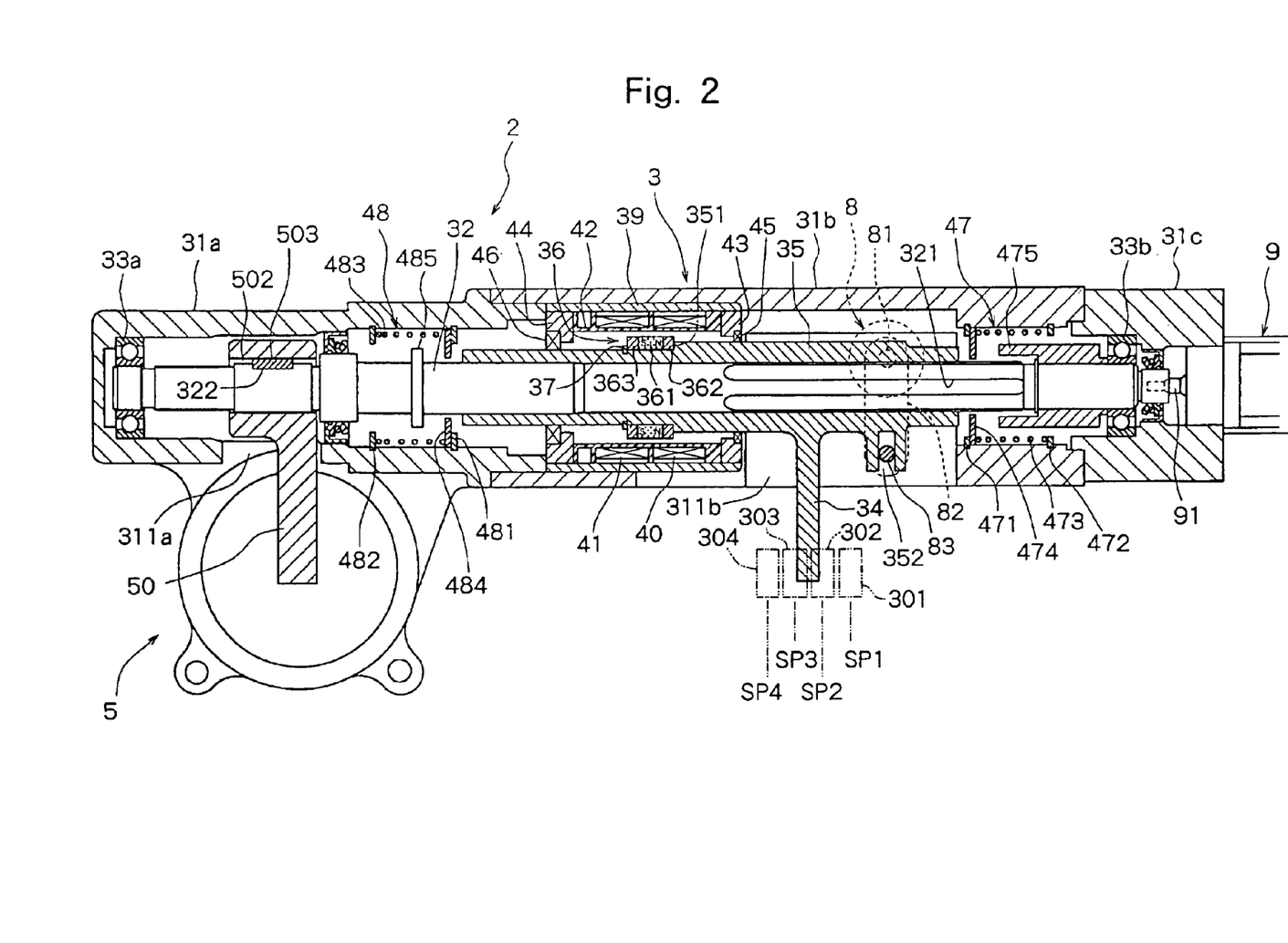
FIG. 2 is a sectional view along the line A—A in FIG. 1.
Figure 3:
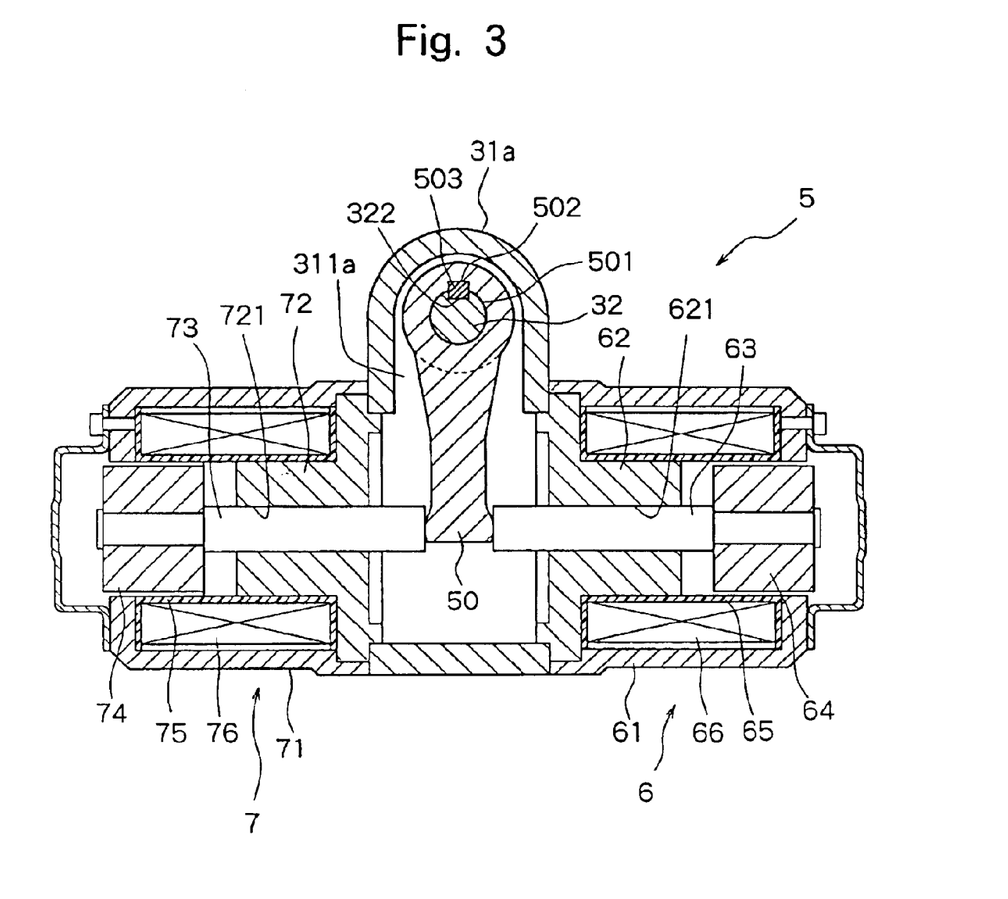
FIG. 3 is a sectional view along the line B—B in FIG. 1.

FIG. 1 is a sectional view illustrating a gear change device constituted according to an embodiment of the present invention, FIG. 2 is a sectional view along the line A—A in FIG. 1, and FIG. 3 is a sectional view along the line B—B in FIG. 1.

A gear change device 2 according to the embodiment is constituted by a select actuator 3 and a shift actuator 5. The select actuator 3 in the illustrated embodiment has three cylindrical casings 31a, 31b and 31c. A control shaft 32 is arranged in the three casings 31a, 31b and 31c, and both ends of the control shaft 32 are rotatably supported by the casings 31a and 31c on both sides via bearings 33a and 33b. A spline 321 is formed in an intermediate portion of the control shaft 32. A cylindrical shift sleeve 35, constituted integratedly with, or otherwise supporting a shift lever 34, is spline-fitted to the spline 321 so as to slide in the axial direction. Therefore, the shift sleeve 35 is disposed slidably in the axial direction on the control shaft 32 that is rotatably arranged in the casing, and works as a shift lever support member for supporting the shift lever. The shift lever 34 and the shift sleeve 35 are made of a nonmagnetic material such as a stainless steel, and the shift lever 34 is disposed through an opening 311b formed in a lower portion of the central casing 31b. An end of the shift lever 34 is so constructed as to suitably engage with shift blocks 301, 302, 303 and 304 which are disposed at a first select position SP1, a second select position SP2, a third select position SP3 and a fourth select position SP4 and constitute a shift mechanism for a transmission that is not shown.

A magnetic moving means 36 is disposed on the outer peripheral surface of the shift sleeve 35. The magnetic moving means 36 is constituted by an annular permanent magnet 361 which is mounted on the outer peripheral surface of the shift sleeve 35 and has magnetic poles in both end surfaces in the axial direction and by a pair of moving yokes 362 and 363 disposed on the outer sides of the permanent magnet 361 in the axial direction thereof. The permanent magnet 361 in the illustrated embodiment is magnetized into an N-pole in the right end surface in FIGS. 1 and 2, and is magnetized into an S-pole in the left end surface in FIGS. 1 and 2. The above pair of moving yokes 362 and 363 is made of a magnetic material in an annular shape. The position of the thus constituted magnetic moving means 36 is determined at the right end (in FIGS. 1 and 2) of the moving yoke 362 (right side in FIGS. 1 and 2) by a step 351 formed in the shift sleeve 35, and at the left end (in FIGS. 1 and 2) of the other moving yoke 363 (left side in FIGS. 1 and 2) by a snap ring 37 fitted to the shift sleeve 35, so that the motion in the axial direction thereof is limited. A fixed yoke 39 is disposed on the outer peripheral side of the magnetic moving means 36 to surround the magnetic moving means 36. The fixed yoke 39 is made of a magnetic material in a cylindrical shape and is mounted on the inner peripheral surface of the central casing 31b. A pair of coils 40 and 41 is arranged on the inside of the fixed yoke 39. The pair of coils 40 and 41 is wound on a bobbin 42 that is made of a nonmagnetic material such as a synthetic resin and that is mounted on the inner peripheral surface of the fixed yoke 39. The pair of coils 40 and 41 is connected to a power source circuit that is not shown. The length of the coil 40 in the axial direction nearly corresponds to a length of selection from the first select position SP1 up to the fourth select position SP4. End walls 43 and 44 are mounted on both sides of the fixed yoke 39. On the inner periphery of the end walls 43 and 44 are mounted sealing members 45 and 46 that come in contact with the outer peripheral surface of the shift sleeve 35.

The select actuator 3 according to the first embodiment is constituted as described above, and works based on a principle of a linear motor that is constituted by the magnetic moving means 36 disposed on the shift sleeve 35 that serves as the shift lever support member, by the fixed yoke 39 and by the pair of coils 40 and 41. The operation will now be described with reference to FIGS. 4A and 4B.

Figure 4:
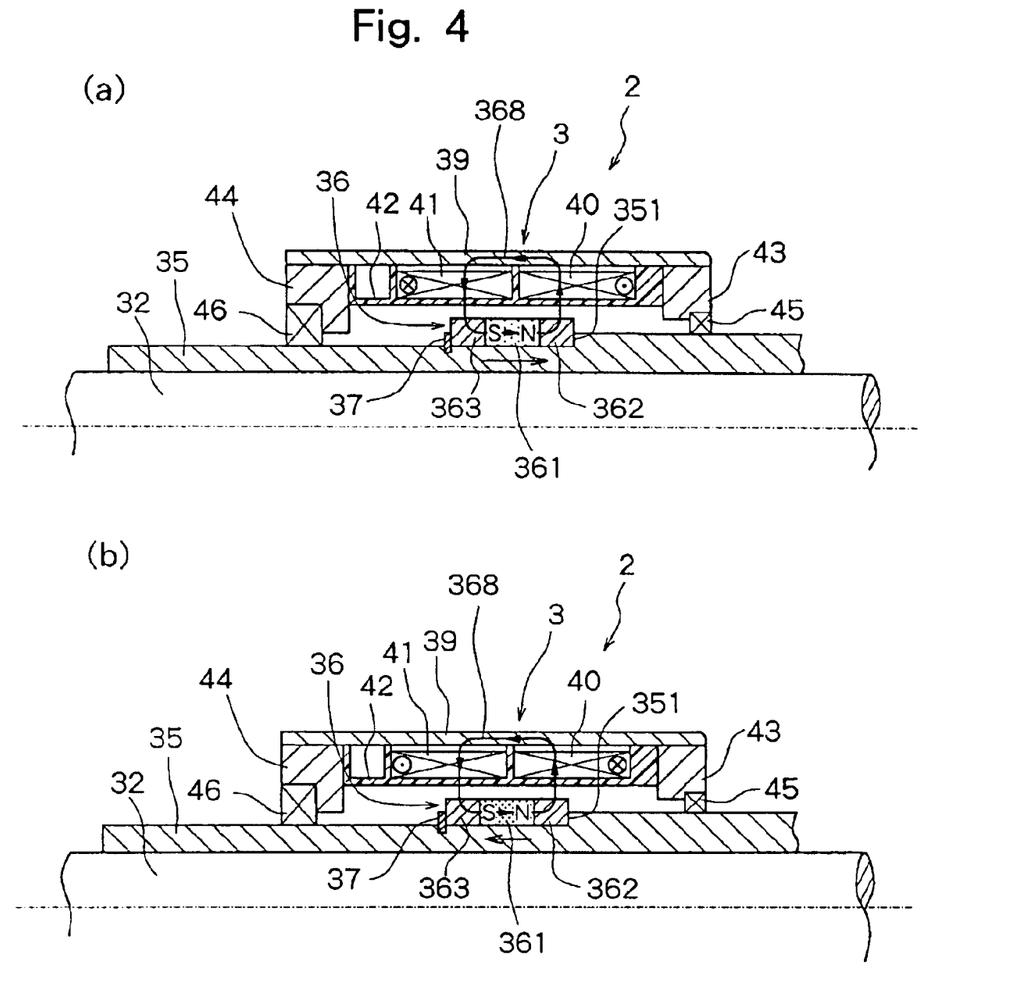

In the select actuator 3 according to the first embodiment, there is established a magnetic circuit 368 passing through the N-pole of permanent magnet 361, one moving yoke 362, one coil 40, fixed yoke 39, the other coil 41, the other moving yoke 363 and S-pole of permanent magnet 361, as shown in FIGS. 4A and 4B. In this state, when electric currents are supplied to the pair of coils 40 and 41 in the directions opposite to each other as shown in FIG. 4A, a thrust toward the right is produced by the magnetic moving means 36, i.e., produced by the shift sleeve 35, as indicated by an arrow in FIG. 4A, due to the Fleming's left-hand rule. As shown in FIG. 4B, on the other hand, when the electric currents are supplied to the pair of coils 40 and 41 in the directions just opposite to the directions of FIG. 4A, a thrust toward the left is produced by the magnetic moving means 36, i.e., produced by the shift sleeve 35, as indicated by an arrow in FIG. 4B, due to the Fleming's left-hand rule. The magnitude of thrust produced by the magnetic moving means 36, i.e., produced by the shift sleeve 35 is determined by the amount of electric power supplied to the pair of coils 40 and 41.

The actuator 3 in the illustrated embodiment has a first select position-limiting means 47 and a second select position-limiting means 48 for limiting the position of the shift lever 34 to the first select position SP1, second select position SP2, third select position SP3 or fourth select position SP4 in cooperation with the magnitude of thrust acting on the magnetic moving means 36, i.e., acting on the shift sleeve 35. The first select position-limiting means 47 comprises snap rings 471 and 472 fitted to right end portions (in FIGS. 1 and 2) of the central casing 31b at a predetermined interval, a compression coil spring 473 disposed between the snap rings 471 and 472, a moving ring 474 disposed between the compression coil spring 473 and one snap ring 471, and a stopper 475 for limiting the motion of the moving ring 474 by coming in contact therewith when the moving ring 474 is moved toward the right in FIGS. 1 and 2 by a predetermined amount.

When in a state as shown in FIGS. 1 and 2, an electric current is supplied to the pair of coils 40 and 41 at a voltage of, for example, 2.4 V as shown in FIG. 4A, the thus constituted first select position-limiting means 47 so works that the magnetic moving means 36 moves, i.e., the shift sleeve 35 moves, toward the right in FIGS. 1 and 2, and the right end of the shift sleeve 35 comes in contact with the moving ring 474 in FIGS. 1 and 2 to be limited in its position. In this state, the resilient force of the coil spring 473 is larger than the thrust that acts on the magnetic moving means 36, i.e., that acts on the shift sleeve 35. Therefore, the shift sleeve 35 in contact with the moving ring 474 is brought to a halt at a position where the moving ring 474 is in contact with the snap ring 471. In this case, the shift lever 34 constituted integratedly with the shift sleeve 35 is brought to the second select position SP2. Next, when a current is supplied to the pair of coils 40 and 41 at a voltage of, for example, 4.8 V as shown in FIG. 4A, the thrust acting on the magnetic moving means 36, i.e., acting on the shift sleeve 35, is larger than the resilient force of the coil spring 473. Accordingly, the shift sleeve 35 that has come in contact with the moving ring 474, then, moves toward the right in FIGS. 1 and 2 against the resilient force of the coil spring 473, and the moving ring 474 is brought to a halt at a position where the moving ring 474 comes in contact with the stopper 475. At this moment, the shift lever 34 constituted integratedly with the shift sleeve 35 is brought to the first select position SP1.

Next, the second select position-limiting means 48 will be described.

The second select position-limiting means 48 comprises snap rings 481 and 482 fitted to left end portions (in FIGS. 1 and 2) of the central casing 31b at a predetermined distance, a coil spring 483 disposed between the snap rings 481 and 482, a moving ring 484 disposed between the coil spring 483 and one snap ring 481, and a stopper 485 for limiting the motion of the moving ring 484 by coming in contact therewith when the moving ring 484 is moved toward the left in FIGS. 1 and 2 by a predetermined amount.

When in a state as shown FIGS. 1 and 2, a current is supplied to the pair of coils 40 and 41 at a voltage of, for example, 2.4 v as shown in FIG. 4B, the thus constituted second select position-limiting means 48 so works that the magnetic moving means 36 moves, i.e., the shift sleeve 35 moves, toward the left in FIGS. 1 and 2, and the left end of the shift sleeve 35 comes in contact with the moving ring 484 in FIGS. 1 and 2 to be limited in its position. In this state, the resilient force of the coil spring 483 is larger than the thrust that acts on the magnetic moving means 36, i.e., that acts on the shift sleeve 35. Therefore, the shift sleeve 35 in contact with the moving ring 484 is brought to a halt at a position where the moving ring 484 is in contact with the snap ring 481. In this case, the shift lever 34 constituted integratedly with the shift sleeve 35 is brought to the third select position SP3. Next, when a current is supplied to the pair of coils 40 and 41 at a voltage of, for example, 4.8 V as shown in FIG. 4B, the thrust acting on the magnetic moving means 36, i.e., acting on the shift sleeve 35, is larger than the resilient force of the coil spring 483. Accordingly, the shift sleeve 35 that has come in contact with the moving ring 484, then, moves toward the left in FIGS. 1 and 2 against the resilient force of the coil spring 483, and the moving ring 484 is brought to a halt at a position where the moving ring 484 comes in contact with the stopper 485. At this moment, the shift lever 34 constituted integratedly with the shift sleeve 35 is brought to the fourth select position SP4.

AS described above, according to the illustrated embodiment provided with the first select position-limiting means 47 and with the second select position-limiting means 48, the shift lever 34 can be brought to a predetermined select position by controlling the amount of electric power supplied to the pair of coils 40 and 41, without executing the position control operation.

With the select actuator 3 of the first embodiment in the gear change device 2 as described above, since the shift sleeve 35, that is constituted integratedly with the shift lever 34 and works as the shift lever support member, operates based on the principle of a linear motor, which is constituted by the magnetic moving means 36, fixed yoke 39 and the pair of coils 40 and 41, the select actuator has improved durability owing to no existence of a rotary mechanism. Further, unlike an actuator using an electric motor, neither a ball-screw mechanism nor a gear mechanism, which constitutes a reduction gear, is necessary. Therefore, the select actuator is constituted in a compact size and operates at an increased speed.

Figure 5:
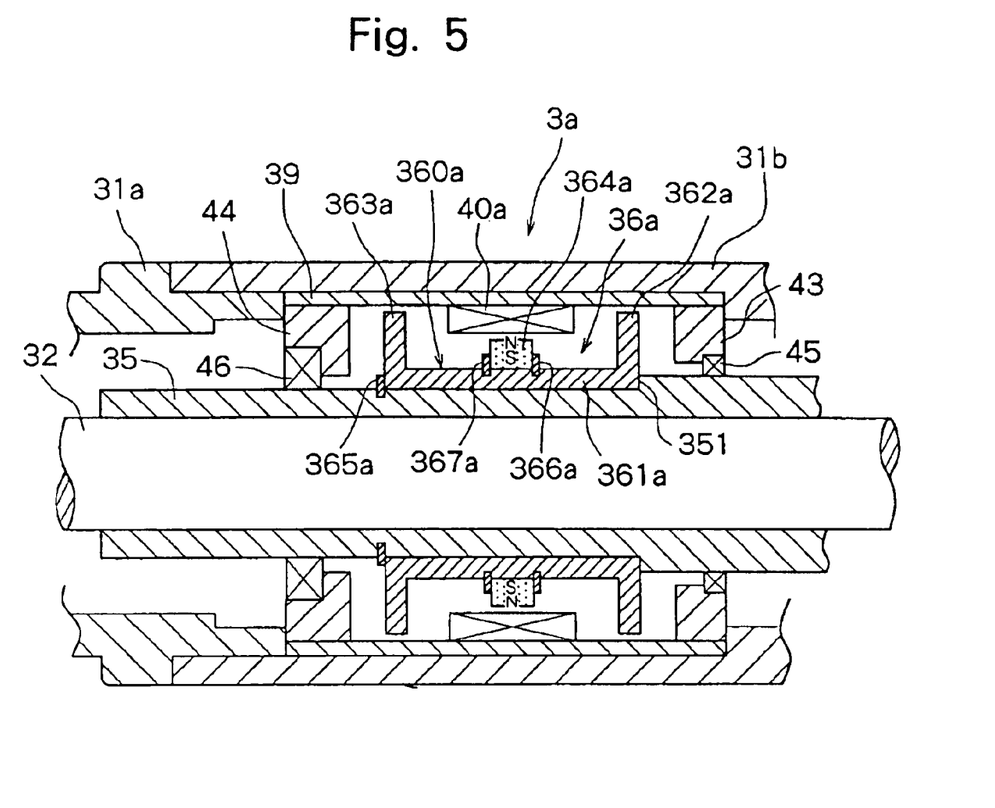
FIG. 5 is a sectional view illustrating a major portion of the select actuator in the gear change device shown in FIG. 1 according to a second embodiment.

Next, a second embodiment of the select actuator in the gear change device 2 will be described with reference to FIGS. 5, 6A, and 6B. The select actuator 3a according to the second embodiment shown in FIG. 5 has a magnetic moving means 36a disposed on the shift sleeve 35 which is the shift lever support member, and a coil 40a disposed on the inside of the fixed yoke 39, which are different from the magnetic moving means 36 and the pair of coils 40, 41 of the select actuator 3 of the above-mentioned first embodiment. Other constituent members, however, may be substantially the same as those of the select actuator 3 of the first embodiment. Therefore, FIG. 5 illustrates only those elements that are different from those of the select actuator 3 of the first embodiment. In FIG. 5, further, the members which are the same as those constituting the select actuator 3 of the first embodiment are denoted by the same reference numerals.

The select actuator 3a according to the second embodiment is constituted by one coil 40a disposed on the inside of the fixed yoke 39. The length of the coil 40a in the axial direction is set to be nearly the same as the length of selection from the first select position SP1 to the fourth select position SP4.

The magnetic moving means 36a comprises a moving yoke 360a mounted on the outer peripheral surface of the shift sleeve 35 which is the shift lever support member, and an annular permanent magnet 364a disposed on the outer peripheral surface of the moving yoke 360a facing the inner peripheral surface of the coil 40a. The moving yoke 360a is made of a magnetic material, and has a cylindrical portion 361a, on which a permanent magnet 364a is mounted, and annular flanges 362a and 363a provided at both ends of the cylindrical portion 361a. The outer peripheral surfaces of the flanges 362a and 363a are close to the inner peripheral surface of the fixed yoke 39. It is desired that the gap between the outer peripheral surfaces of the flanges 362a, 363a and the inner peripheral surface of the fixed yoke 39 be as small as possible. By taking errors in the production into consideration, however, the gap in the illustrated embodiment is set to be 0.5 mm. Referring to FIG. 5, the thus constituted moving yoke 360a has the position of its right end determined by a step 351 formed in the shift sleeve 35 and the position of its left end determined by a snap ring 365a fitted to the shift sleeve 35 so as to be limited in its motion in the axial direction. The permanent magnet 364a has magnetic poles in the outer peripheral surface and in the inner peripheral surface thereof. In the illustrated embodiment, an N-pole is formed in the outer peripheral surface and an S-pole is formed in the inner peripheral surface. The thus formed permanent magnet 364a is mounted on the outer peripheral surface of the cylindrical portion 361a of the moving yoke 360a and is limited in its motion in the axial direction by snap rings 366a and 367a arranged on both sides of the permanent magnet 364a and mounted to the cylindrical portions 361a.

The select actuator 3a according to the second embodiment is constituted as described above. The operation will now be described with reference to FIGS. 6A and 6B.

Figure 6:
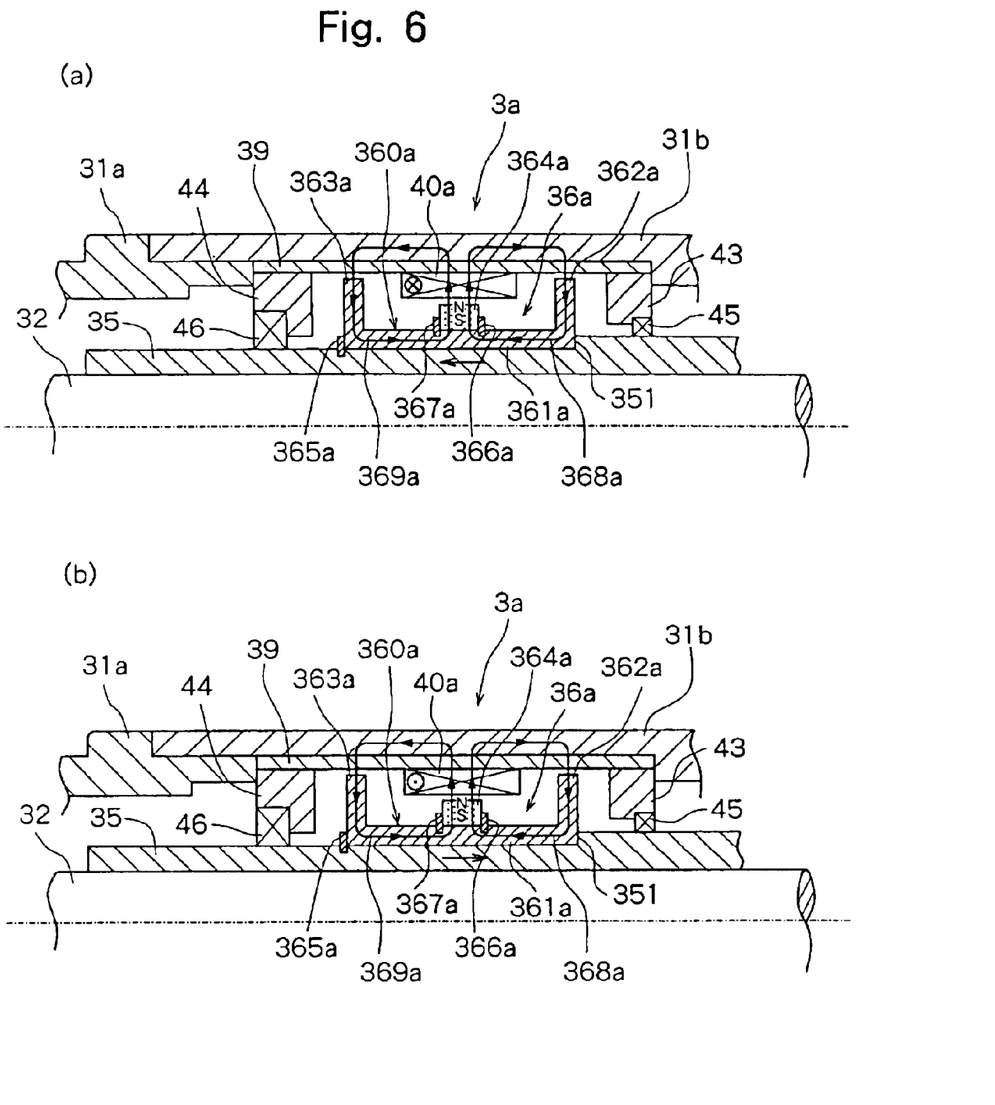

In the select actuator 3a of the second embodiment as shown in FIGS. 6A and 6B, a first magnetic flux circuit 368a and a second magnetic flux circuit 369a are formed by the permanent magnet 364a. That is, in the select actuator 3a of the second embodiment, there are established the first magnetic circuit 368a passing through the N-pole of permanent magnet 364a, coil 40a, fixed yoke 39, flange 362a of moving yoke 360a, cylindrical portion 361a of moving yoke 360a and the S-pole of permanent magnet 364a, and the second magnetic circuit 369a passing through the N-pole of permanent magnet 364a, coil 40a, fixed yoke 39, flange 363a of moving yoke 360a, cylindrical portion 361a of the moving yoke 360a and the S-pole of the permanent magnet 364a. When in this state, an electric current is supplied to the coil 40a in the direction shown in FIG. 6A, a thrust is produced toward the left on the magnetic moving means 36a, i.e., on the shift sleeve 35 as indicated by an arrow in FIG. 6A. On the other hand, when the current is supplied to the coil 40a in a direction opposite to the direction of FIG. 6A, as shown in FIG. 6B, a thrust is produced toward the right on the magnetic moving means 36a, i.e., on the shift sleeve 35 as indicated by an arrow in FIG. 6B. In the select actuator 3a according to the second embodiment as shown in FIGS. 6A and 6B, since the first magnetic flux circuit 368a and the second magnetic flux circuit 369a are formed by the permanent magnet 364a, and since in the select actuator 3a the inner peripheral surface of the fixed yoke 39 is close to the outer peripheral surfaces of the flanges 362a and 363a of the moving yoke 360a, a large air gap to the magnetic flux is formed by the coil 40a only. Accordingly, the select actuator 3a of the illustrated embodiment can minimize the air gap in the magnetic flux circuit formed by the permanent magnet 364a and hence, produces a large thrust.

Figure 7:
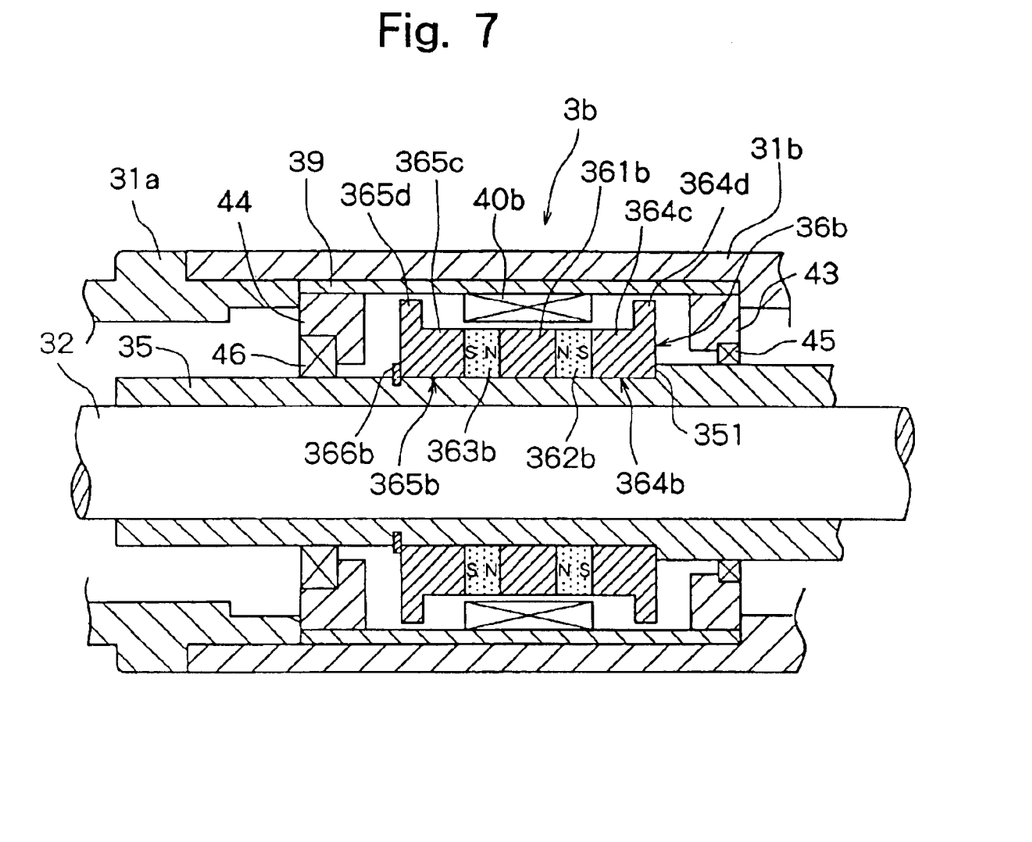
FIG. 7 is a sectional view illustrating a major portion of the select actuator in the gear change device shown in FIG. 1 according to a third embodiment.
Figure 8:
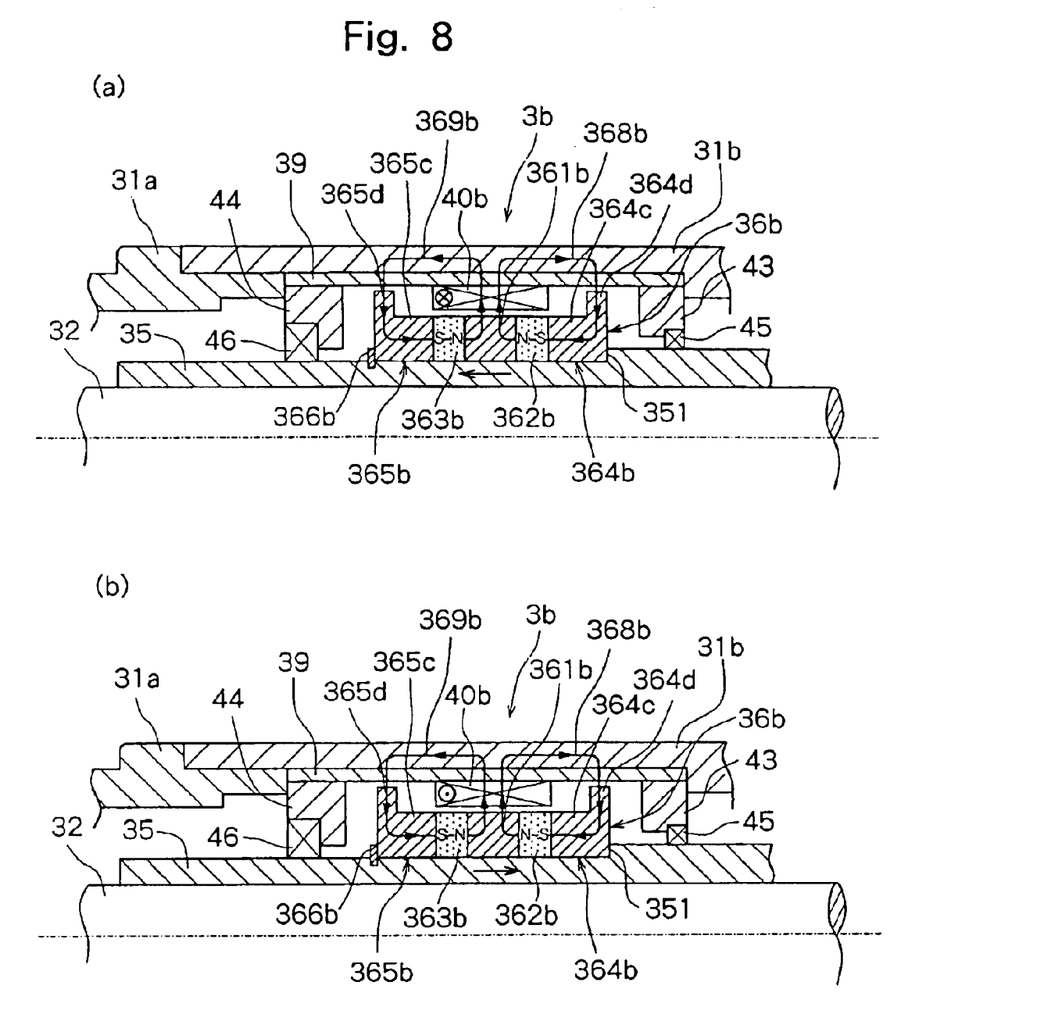

Next, a third embodiment of the select actuator in the gear change device 2 will be described with reference to FIGS. 7 and 8. The select actuator 3b according to the third embodiment shown in FIG. 7 has a magnetic moving means 36b disposed on the shift sleeve 35, which is the shift lever support member, which is different from the magnetic moving means 36a of the select actuator 3a of the above-mentioned second embodiment. Other constituent members, however, may be substantially the same as those of the select actuator 3a of the second embodiment. Therefore, FIG. 7 illustrates only those elements that are different from those of the select actuator 3a of the second embodiment. In FIG. 7, further, the members the same as those constituting the select actuator 3a of the second embodiment are denoted by the same reference numerals.

The select actuator 3b according to the third embodiment is constituted by one coil 40b disposed on the inside of the fixed yoke 39 like the select actuator 3a of the second embodiment. The length of the coil 40b in the axial direction is set to be nearly the same as the length of selection from the first select position SP1 to the fourth select position SP4.

The magnetic moving means 36b comprises an intermediate yoke 361b that is mounted on the outer peripheral surface of the shift sleeve 35 and is opposed to the inner peripheral surface of the coil 40b, a pair of permanent magnets 362b and 363b disposed respectively on both sides of the intermediate yoke 361b to hold it therebetween, and a pair of moving yokes 364b and 365b disposed respectively on the outer sides of the pair of permanent magnets 362b and 363b in the axial direction thereof. The intermediate yoke 361b is made of a magnetic material in an annular shape. The pair of permanent magnets 362b and 363b have magnetic poles in both end surfaces in the axial direction thereof.

In the illustrated embodiment, N-poles are formed in the end surfaces facing each other, and S-poles are formed in the outer end surfaces in the axial direction thereof. The pair of moving yokes 364b, 365b are made of a magnetic material, and have cylindrical portions 364c, 365c and annular flanges 364d, 365d provided respectively at the outer ends of the cylindrical portions 364c, 365c in the axial direction thereof, the outer peripheral surfaces of the flanges 364d and 365d being close to the inner peripheral surface of the fixed yoke 39. The gap between the outer peripheral surfaces of the flanges 364d, 365d and the inner peripheral surface of the fixed yoke 39 is set to be 0.5 mm, like in the magnet-type actuator 3a of the second embodiment. In the illustrated embodiment, the above-mentioned pair of moving yokes 364b and 365b are constituted respectively by the cylindrical portions 364c, 365c and by the flanges 364d, 365d. Here, however, the outer peripheral surfaces may be constituted by only the flanges that are located close to the inner peripheral surface of the fixed yoke 39. The thus constituted pair of moving yokes 364b and 365b are positioned at the right end (in FIG. 7) of one moving yoke 364b (right side in FIG. 7) by a step 351 formed in the shift sleeve 35 and at the left end (in FIG. 7) of the other moving yoke 365b (left side in FIG. 7) by a snap ring 366b fitted to the shift sleeve 35 so as to be limited for its motion in the axial direction.

The select actuator 3b according to the third embodiment is constituted as described above. The operation will now be described with reference to FIGS. 8A and 8B.

In the select actuator 3b of the third embodiment as shown in FIGS. 8A and 8B, a first magnetic flux circuit 368b and a second magnetic flux circuit 369b are formed by the pair of permanent magnets 362b and 363b. That is, in the select actuator 3b of the illustrated embodiment, there are established the first magnetic circuit 368b passing through the N-pole of permanent magnet 362b, intermediate yoke 361b, coil 40b, fixed yoke 39, flange 364d of the moving yoke 364b, cylindrical portion 364c of the moving yoke 364b and S-pole of the permanent magnet 362b, and the second magnetic circuit 369b passing through the N-pole of permanent magnet 363b, intermediate yoke 361b, coil 40b, fixed yoke 39, flange 365d of the moving yoke 365b, cylindrical portion 365c of the moving yoke 365b and S-pole of the permanent magnet 363b. When in this state, an electric current is supplied to the coil 40b in the direction shown in FIG. 8A, a thrust is produced toward the left on the magnetic moving means 36b, i.e., on the shift sleeve 35 as indicated by an arrow in FIG. 8A. On the other hand, when the current is supplied to the coil 40b as shown in FIG. 8B, which is opposite to the direction of FIG. 8A, a thrust is produced toward the right on the magnetic moving means 36b, i.e., on the shift sleeve 35, as indicated by an arrow in FIG. 8B.

According to the select actuator 3b of the third embodiment as described above, the pair of permanent magnets 362b and 363b are arranged on the both sides of the intermediate yoke 361b to hold it therebetween, and the N-poles are formed in the end surfaces facing each other of the pair of permanent magnets 362b and 363b. Therefore, the magnetic fluxes going out from the two permanent magnets 362b and 363b travel toward the coil 40b while being repelled by each other. In the select actuator 3b of the third embodiment, therefore, the magnetic fluxes pass through the coil 40b at right angles therewith, enabling the pair of permanent magnets 362b and 363b, i.e., enabling the output shaft shift sleeve 35, to produce a large thrust. The S-pole may be formed in the end surfaces facing each other of the pair of permanent magnets 362b and 363b. That is, it is desired that the same pole be formed in the end surfaces facing each other of the pair of permanent magnets 362b and 363b. In the select actuator 3b of the third embodiment, further, there are established the first magnetic flux circuit 368b and the second magnetic flux circuit 369b by the pair of permanent magnets 362b and 363b as shown in FIGS. 8A and 8B, and the inner peripheral surface of the fixed yoke 39 is located close to the outer peripheral surfaces of flanges 364d, 365d of the pair of moving yokes 364b, 365b. Therefore, a large air gap to the magnetic flux is formed by the coil 40b only. Accordingly, the magnet-type actuator 3b of the third embodiment makes it possible to minimize the air gap in the magnetic flux circuits based on the pair of permanent magnets 362b and 363b, and to produce a large thrust.

Next, the shift actuator 5 will be described with reference chiefly to FIG. 3.

The illustrated shift actuator 5 comprises a first electromagnetic solenoid 6 and a second electromagnetic solenoid 7 for actuating an operation lever 50 mounted, on the control shaft 32 which is arranged in the casings 31a, 31b, 31c of the select actuator 3. The operation lever 50 has a hole 501 formed in its base portion to be fitted to the control shaft 32. A key 503 is fitted to a key groove 502 formed in the inner peripheral surface of the hole 501 and to a key groove 322 formed in the outer peripheral surface of the control shaft 32, so that the operation lever 50 turns, as a unitary structure, together with the control shaft 32. The operation lever 50 is disposed through an opening 311a formed in the lower portion of the casing 31a which is on the left side in FIGS. 1 and 2.

Next, the first electromagnetic solenoid 6 will be described.

The first electromagnetic solenoid 6 comprises a casing 61, a fixed iron core 62 that is made of a magnetic material and is disposed in the casing 61, an operation rod 63 that is made of a nonmagnetic material such as a stainless steel and is disposed through a through hole 621 formed in the central portion of the fixed iron core 62, a moving iron core 64 that is made of a magnetic material and is mounted on the operation rod 63, and an electromagnetic coil 66 wound on a bobbin 65 made of a nonmagnetic material such as synthetic resin arranged between the casing 61 and the moving iron core 64 as well as the fixed iron core 62. The thus constituted first electromagnetic solenoid 6 so works that the moving iron core 64 is attracted by the fixed iron core 62 when an electric current is supplied to the electromagnetic coil 66. As a result, the operation rod 63, mounted adjacent the moving iron core 64 moves toward the left in FIG. 3, and its end acts on the operation lever 50 to turn it clockwise on the control shaft 32 as a center. Thereby, the shift lever 34, constituted integratedly with the shift sleeve 35 mounted on the control shaft 32, undergoes a shifting operation in one direction.

Next, the second electromagnetic solenoid 7 will be described.

The second electromagnetic solenoid 7 is disposed on the opposite side of operation lever 50 relative to the first electromagnetic solenoid 6. Like the first electromagnetic solenoid 6, the second electromagnetic solenoid 7, too, comprises a casing 71, a fixed iron core 72 that is made of a magnetic material and is disposed in the casing 71, an operation rod 73 that is made of a nonmagnetic material such as a stainless steel and is disposed through a through hole 721 formed in the central portion of the fixed iron core 72, a moving iron core 74 that is made of a magnetic material and is mounted on the operation rod 73, and an electromagnetic coil 76 wound on a bobbin 75 made of a nonmagnetic material such as synthetic resin arranged between the casing 71 and the moving iron core 74 as well as the fixed iron core 72. The thus constituted second electromagnetic solenoid 7 so works that the moving iron core 74 is attracted by the fixed iron core 72 when an electric current is supplied to the electromagnetic coil 76. As a result, the operation rod 73, mounted adjacent the moving iron core 74, moves toward the right in FIG. 3, and its end acts on the operation lever 50 to turn it counterclockwise on the control shaft 32 as a center. Then, the shift lever 34, constituted integratedly with the shift sleeve 35 mounted on the control shaft 32, undergoes a shifting operation in the other direction.

The gear change device according to the illustrated embodiment has a select position sensor 8 for detecting the position of the shift sleeve 35 as the shift lever support member constituted integratedly with the shift lever 34, i.e., for detecting the position thereof in the direction of selection. The select position sensor 8 comprises a potentiometer, and a rotary shaft 81 thereof is attached to an end of a lever 82. An engaging pin 83 attached to the other end of the lever 82 is brought into engagement with an engaging groove 352 formed in the shift sleeve 35. Therefore, as the shift sleeve 35 moves toward the right or left in FIG. 2, the lever 82 swings on the rotary shaft 81 as a center, and the rotary shaft 81 rotates to detect the operation position of the shift sleeve 35, i.e., to detect the position thereof in the direction of selection. In response to a signal from the select position sensor 8, the shift lever 34 is brought to a desired select position by controlling the voltage and the direction of the electric current supplied to the coils 40 and 41 (40a and 40b) of the select actuator 3 (3a and 3b) by using a control means which is not shown.

Further, the gear change device 2 of the illustrated embodiment has a shift stroke position sensor 9 for detecting the rotational position, i.e., for detecting the shift stroke position of the control shaft 32 which mounts the shift sleeve 35 as the shift lever support member constituted integratedly with the shift lever 34. The shift stoke position sensor 9 comprises a potentiometer with its rotary shaft 91 being linked to the control shaft 32. When the control shaft 32 rotates, therefore, the rotary shaft 91 rotates to detect the rotational position, i.e., the shift stroke position, of the control shaft 32.

Next, the gear change device constituted according to another embodiment of the present invention will be described with reference to FIGS. 9 and 10. In the gear change device 10 shown in FIGS. 9 and 10, the members substantially the same as those of the gear change device 2 shown in FIGS. 1 to 3 are denoted by the same reference numerals.

Figure 9:
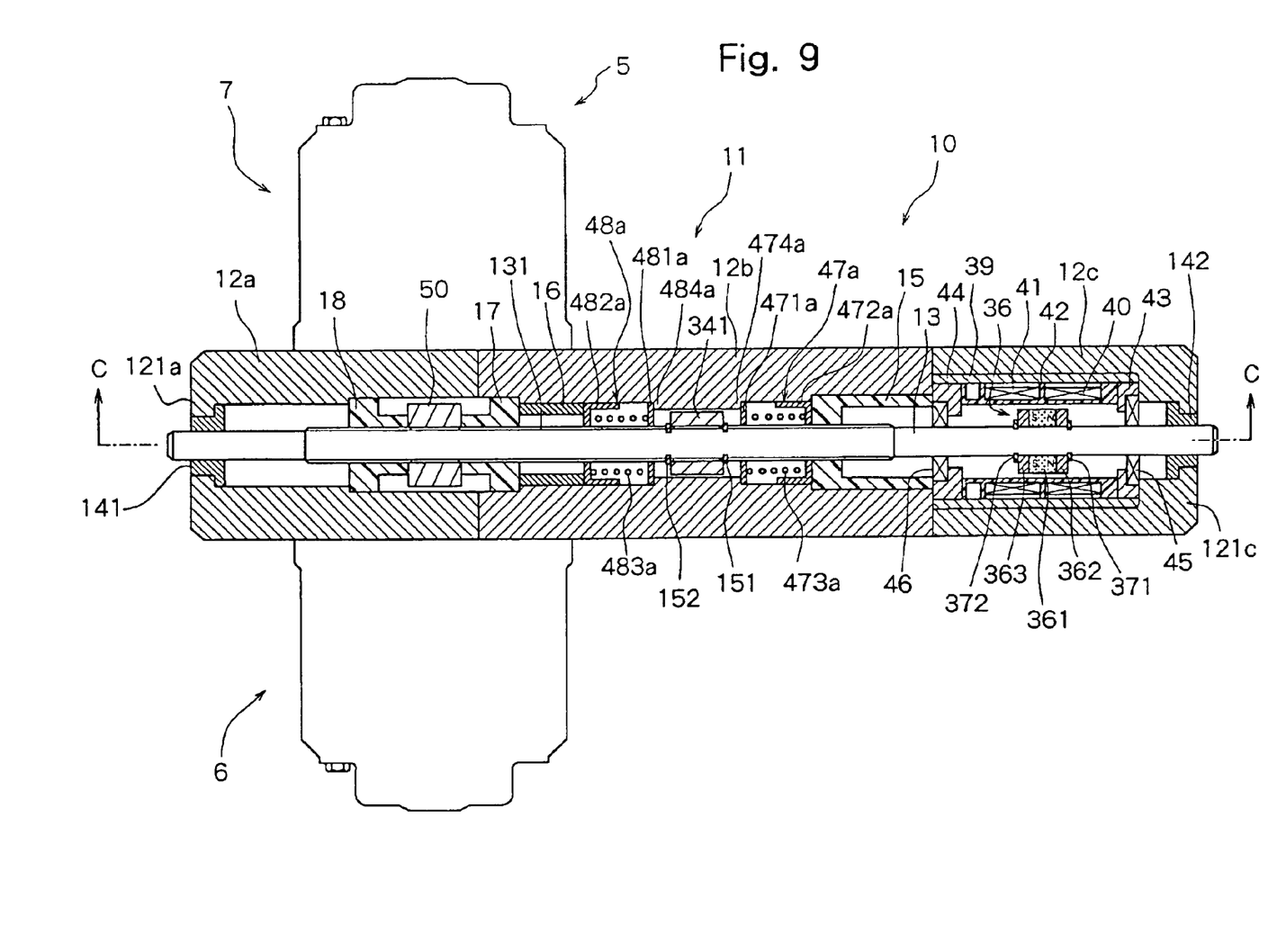
FIG. 9 is a sectional view illustrating a gear change device constituted according to another embodiment of the present invention.
Figure 10:
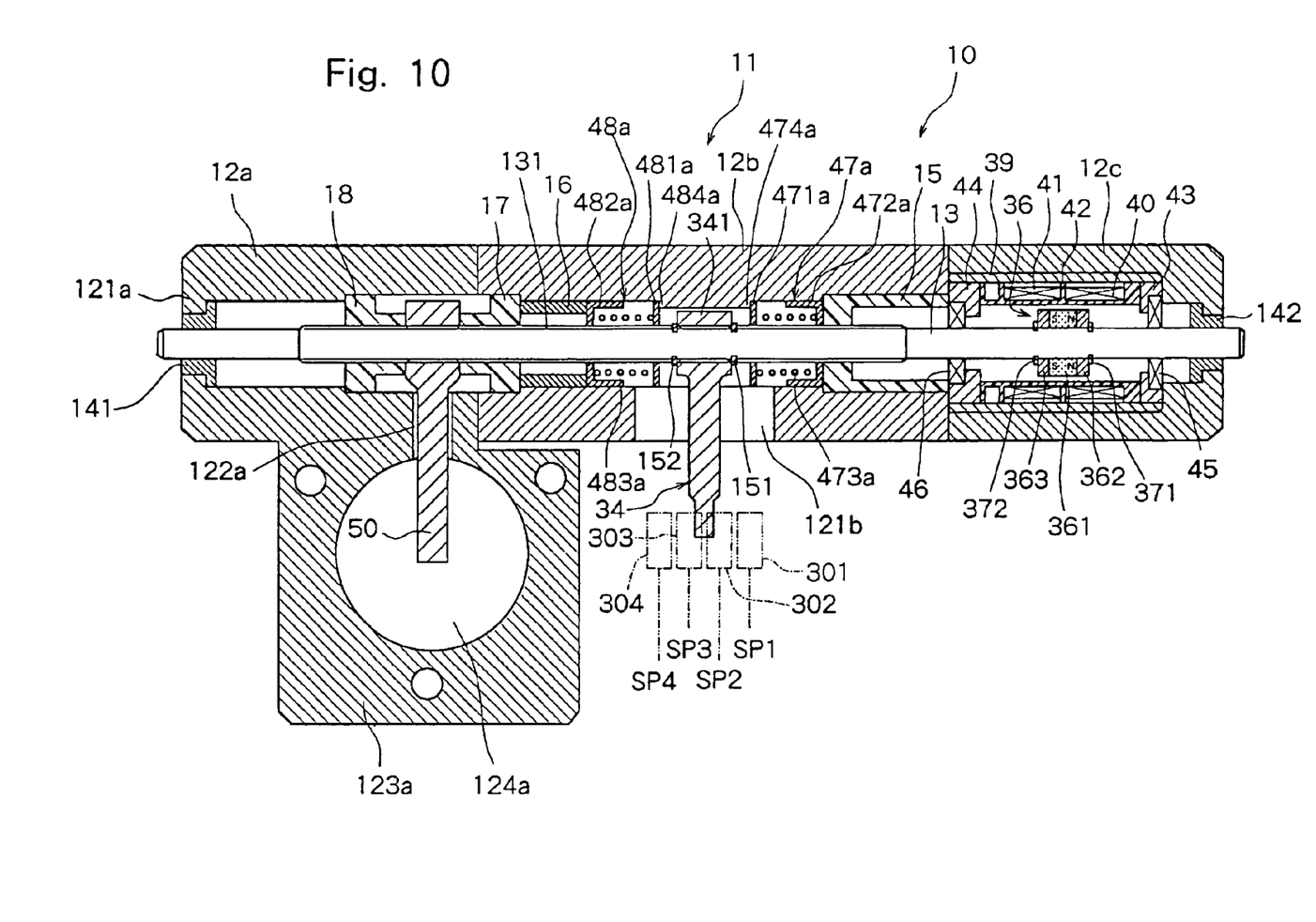
FIG. 10 is a sectional view along the line C—C in FIG. 9.

FIG. 9 is a sectional view illustrating the gear change device constituted according to another embodiment of the present invention, and FIG. 10 is a sectional view along the line C—C in FIG. 9. Like the gear change device 2 shown in FIGS. 1 to 3, the gear change device 10 shown in FIGS. 9 and 10, too, is constituted by a select actuator 11 and a shift actuator 5. The select actuator 11 in the illustrated embodiment comprises three cylindrical casings 12a, 12b and 12c which are connected to each other. In FIGS. 9 and 10, the casing 12a on the left side has an end wall 121a at the left end thereof, is opened at the right end thereof, and has an opening 122a formed in the lower portion thereof. The casing 12a on the left side is provided with a shift actuator-mounting portion 123a formed to protrude downward. In the shift actuator-mounting portion 123a is formed an opening 124a which communicates with the opening 122a and is at right angles with the axial direction of the casing. The center casing 12b has both its ends open and has an opening 121b formed in the lower portion at the center thereof. The casing 12c on the right side is open at the left end in FIGS. 9 and 10, and is provided with an end wall 121c at the right end in FIGS. 9 and 10.

A control shaft 13 is disposed in the thus constituted three casings 12a, 12b and 12c and is supported at its both ends by thrust bearings 141 and 142 mounted on the end wall 121a of the casing 12a of the left side and on the end wall 121c of the casing 12c of the right side so as to rotate and slide in the axial direction. The control shaft 13 is constituted of a nonmagnetic material such as stainless steel and has an external spline 131 formed in the central portion thereof. A mounting portion 341 of the shift lever 34 is spline-fitted to the external spline 131 formed on the control shaft 13, and the motion thereof in the axial direction is limited by snap rings 151 and 152 fitted to the control shaft 13 on both sides thereof. Therefore, the shift lever 34 operates integratedly with the control shaft 13. The control shaft 13 therefore works as a shift lever support member that supports the shift lever and enables the shift lever to slide in the axial direction and to rotate. The shift lever 34 is disposed through opening 121b formed in the lower portion of the central casing 12b. The end of the shift lever 34 is so constructed as to suitably engage with shift blocks 301, 302, 303, 304 which are disposed at the first select position SP1, second select position SP2, third select position SP3 and fourth select position SP4 and constitute the shift mechanism for the transmission that is not shown.

A magnetic moving means 36 is disposed on the outer peripheral surface of the control shaft 13 on a portion corresponding to the casing 12c of the right side. The magnetic moving means 36 is constituted of an annular permanent magnet 361 that is mounted on the outer peripheral surface of the control shaft 13 and has magnetic poles in both end surfaces in the axial direction thereof, and a pair of moving yokes 362 and 363 disposed on the outer sides of the permanent magnet 361 in the axial direction thereof, like in the embodiment shown in FIGS. 1 to 3. The permanent magnet 361 in the illustrated embodiment is magnetized into an N-pole in the right end surface in FIGS. 9 and 10, and is magnetized into an s-pole in the left end surface in FIGS. 9 and 10. The position of the thus constituted magnetic moving means 36 is determined by snap rings 371 and 372 mounted onto the control shaft 13, and thus the magnetic moving means 36 is limited from moving in the axial direction. A fixed yoke 39, surrounding the magnetic moving means 36, is arranged on the outer peripheral side of the magnetic moving means 36. The fixed yoke 39 is made of a magnetic material in a cylindrical shape and is mounted on the inner peripheral surface of the casing 12c on the right side. A pair of coils 40 and 41 is arranged on the inside of the fixed yoke 39. The pair of coils 40 and 41 is wound on a bobbin 42 that is made of a nonmagnetic material, such as a synthetic resin, and that is mounted on the inner peripheral surface of the fixed yoke 39. The pair of coils 40 and 41 is connected to a power-source circuit which is not shown. Thrust is produced on the magnetic moving means 36, i.e., on the control shaft 13 in the directions the same as those of the embodiment shown in FIGS. 1 to 3 depending upon the electric power supplied to the pair of coils 40 and 41. End walls 43 and 44 are mounted on both sides of the fixed yoke 39. Sealing members 45 and 46 are mounted on the inner peripheries of the end walls 43 and 44 to come into contact with the outer peripheral surface of the control shaft 13.

On both sides of the shift lever 34, there are provided first select position-limiting means 47a and second select position-limiting means 48a for limiting the position of the shift lever 34 to the first select position SP1, second select position SP2, third select position SP3 or fourth select position SP4 in cooperation with the magnitude of the thrust produced on the magnetic moving means 36, i.e., produced on the control shaft 13 as the shift lever support member in proportion to the amount of electric power supplied to the pair of coils 40 and 41. The first select position-limiting means 47a is located between the shift lever 34 and a bearing bush 15 which is disposed at the right end of the central casing 12b in FIGS. 9, 10, is made of a synthetic resin having good sliding property and supports the control shaft 13 so as to slide in the axial direction and to rotate. The first select position-limiting means 47a is constituted of an annular moving ring 471a which is allowed to slide along the control shaft 13, an annular stopper 472a that is disposed on the right side of the moving ring 471a and is limited by the bearing bush 15 from moving toward the right in FIGS. 9 and 10, and a compression coil spring 473a disposed between the moving ring 471a and the annular stopper 472a. The moving ring 471a comes in contact with a step 474a formed in the central portion of the central casing 12b, and so is limited from moving toward the left beyond the state shown in FIGS. 9 and 10.

The second select position-limiting means 48a is located between the shift lever 34 and a cylindrical spacer 16 disposed at the left end of the central casing 12b in FIGS. 9 and 10. The second select position-limiting means 48a is constituted of an annular moving ring 481a which is allowed to slide along the control shaft 13, an annular stopper 482a that is disposed on the left side of the moving ring 481a and is limited by the cylindrical spacer 16 from moving toward the left in FIGS. 9 and 10, and a compression coil spring 483a disposed between the moving ring 481a and the annular stopper 482a. The moving ring 481a comes in contact with a step 484a formed in the central portion of the central casing 12b and so is limited from moving toward the right beyond the state shown in FIGS. 9 and 10.

The select actuator 10 shown in FIGS. 9 and 10 is constituted as described above. The operation will now be briefly described.

When no electric power is supplied (no current is supplied) to the pair of coils 40 and 41 constituting the select actuator 10, the moving ring 471a and the moving ring 481a are brought into contact with the steps 474a and 484a formed in the central portion of the central casing 12b due to the resilient forces of the compression coil spring 473a of the first select position-limiting means 47a and of the compression coil spring 483a of the second select position-limiting means 48a. As a result, the shift lever 34 mounted on the control shaft 13 is in a free state between the second select position SP2 and the third select position SP3 shown in FIGS. 9 and 10 in the direction of selection (right-and-left direction in FIGS. 9 and 10).

When, in the state shown in FIGS. 9 and 10, a current with a voltage of, for example, 2.4 V is supplied to the pair of coils 40, 41 constituting the select actuator 10 in the same manner as in FIG. 4A, the magnetic moving means 36 produces, i.e., the control shaft 13 which is the shift lever support member produces, a thrust toward the right in FIGS. 9 and 10, and moves toward the right in FIGS. 9 and 10, so that the mounting portion 341 of the shift lever 34 comes in contact with the moving ring 471a. Here, the load of the compression coil spring 473a has been set to be larger than the thrust of the select actuator 10 of when the voltage of 2.4

V is applied and, hence, the moving ring 471a is not displaced. Therefore, the control shaft 13 comes to a halt at a position where the right end of the mounting portion 341 of the shift lever 34 comes in contact with the moving ring 471a that constitutes the second select position-limiting means 47a. As a result, the shift lever 34 mounted on the control shaft 13 is brought to the second operation position SP2.

Next, when a current with a voltage of, for example, 4.8 V is supplied to the pair of coils 40 and 41 in the same manner as in FIG. 4A, the thrust acting on the magnetic moving means 36, i.e., acting on the control shaft 13 which is the shift lever support member, becomes greater than the resilient force of the compression coil spring 473a constituting the first select position-limiting means 47a. Accordingly, the shift lever 34 moves toward the right in FIGS. 9 and 10, in a state of being in contact with the moving ring 471a against the resilient force of the compression coil spring 473a, and comes to a halt at a position where the moving ring 471a comes in contact with the stop er 472a. At this moment, the shift lever 34 mounted on the control shaft 13 is brought to the first select position SP1.

When, in a state shown in FIGS. 9 and 10, a current with a voltage of, for example, 2.4 V is supplied to the pair of coils 40, 41 constituting the select actuator 10 in the same manner as in FIG. 4B, the magnetic moving means 36 produces, i.e., the control shaft 13 which is the shift lever support member produces, a thrust toward the left in FIGS. 9 and 10 and moves toward the left in FIGS. 9 and 10, so that the mounting portion 341 of the shift lever 34 comes in contact with the moving ring 481a. Here, the load of the compression coil spring 483a has been set to be larger than the thrust of the select actuator 10 when the voltage of 2.4 V is applied, and, hence, the moving ring 481a is not displaced. Therefore, the control shaft 13 comes to a halt at a position where the left end of the mounting portion 341 of the shift lever 34 comes in contact with the moving ring 481a that constitutes the second select position-limiting means 48a. As a result, the shift lever 34, mounted on the control shaft 13, is brought to the third operation position SP3.

Next, when a current with a voltage of, for example, 4.8 V is supplied to the pair of coils 40 and 41 in the same manner as in FIG. 4B, the thrust acting on the magnetic moving means 36, i.e., acting on the control shaft 13, which is the shift lever support member, is greater than the resilient force of the compression coil spring 483a constituting the second select position-limiting means 48a. Accordingly, the shift lever 34 moves toward the left in FIGS. 9 and 10, in a state of being in contact with the moving ring 481a, against the resilient force of the compression coil spring 483a and comes to a halt at a position where the moving ring 481a comes in contact with the stopper 482a. At this moment, the shift lever 34 mounted on the control shaft 13 is brought to the fourth select position SP4.

The shift actuator 5 will be described next.

The illustrated shift actuator 5 comprises a first electromagnetic solenoid 6 and a second electromagnetic solenoid 7 for actuating the operation lever 50 which is spline-fitted, at its base portion, to the external spline 131 of the control shaft 13 so as to slide in the axial direction. On both sides of the base portion of the operation lever 50, there are arranged bearing bushes 17 and 18 made of a synthetic resin having good sliding property to support the control shaft 13 so as to slide in the axial direction and to rotate. Bearing bush 17 is limited by a step formed in the central casing 12b from moving toward the right in FIGS. 9 and 10, and bearing bush 18 is limited by a step formed in the casing 12a of the left side from moving toward the left in FIGS. 9 and 10. Therefore, the operation lever 50, disposed between the bearing bushes 17 and 18, is limited from moving in the axial direction. The operation lever 50 is inserted in the opening 122a formed in the lower portion of the casing 12a of the left side and has its end at the center of the opening 124a formed in the shift actuator-mounting portion 123a. The first electromagnetic solenoid 6 and the second electromagnetic solenoid 7 for actuating the thus constituted operation lever 50, are mounted on both sides of the shift actuator-mounting portion 123a. The first electromagnetic solenoid 6 and the second electromagnetic solenoid 7 are constituted substantially in the same manner as the first electromagnetic solenoid 6 and the second electromagnetic solenoid 7 shown in FIG. 3, and so are not described here again.

The embodiment shown in FIGS. 9 and 10 has dealt with the case of using, as a magnetic moving means, the magnetic moving means 36 of the embodiment shown in FIGS. 1 and 2. It is, however, also allowable to use the magnetic moving means 36a and the magnetic moving means 36b shown in FIGS. 5 and 7.

The gear change device constituted according to the present invention exhibits action and effect as described below.

That is, in the select actuator constituting the gear change device of the present invention, the shift lever support member supporting the shift lever operates based on the principle of a linear motor which is constituted of a magnetic moving means, a fixed yoke and a coil. Therefore, the select actuator features improved durability since it has no rotary mechanism, features a compact constitution and an increased operation speed since it needs no reduction mechanism constituted of a ball-screw mechanism or a gear mechanism that is employed by the actuator using an electric motor.

What I claim is:

1. A gear change device, comprising:

a shift lever;

a select actuator for operating said shift lever in a direction of selection; and a shift actuator for operating said shift lever in a direction of shift, wherein:

said select actuator comprises a casing, a shift lever support member disposed in said casing so as to slide in an axial direction and support said shift lever, magnetic moving means disposed on the outer periphery of said shift lever support member, a cylindrical fixed yoke surrounding said magnetic moving means, and a coil disposed on the inside of said fixed yoke; and said magnetic moving means comprises an intermediate yoke mounted on the outer peripheral surface of said shift lever support member, a pair of annular permanent magnets disposed respectively on both sides of said intermediate yoke, holding said intermediate yoke therebetween and having magnetic poles in both end surfaces thereof in the axial direction, and movable yokes disposed respectively on the outer sides of said pair of permanent magnets in the axial direction thereof; said movable yokes having annular flanges located close to the inner peripheral surface of said fixed yoke.

2. A gear change device according to claim 1, wherein said pair of permanent magnets have end surfaces that are opposed to each other and that are of the same polarity.

* * * * *